Oct. 13, 1959  J. W. LUDOWICI  2,908,524
APPARATUS FOR TRANSPORTING A STACK OF ARTICLES
INTO AND OUT OF A PROCESSING CHAMBER
Filed March 20, 1956  3 Sheets-Sheet 1
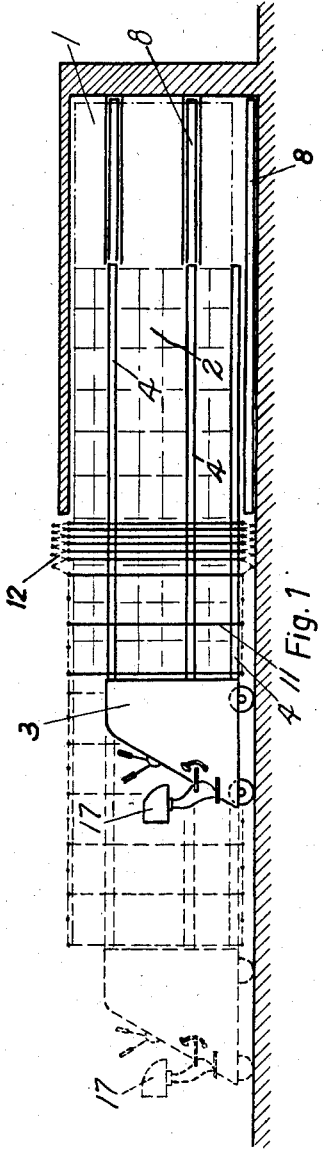
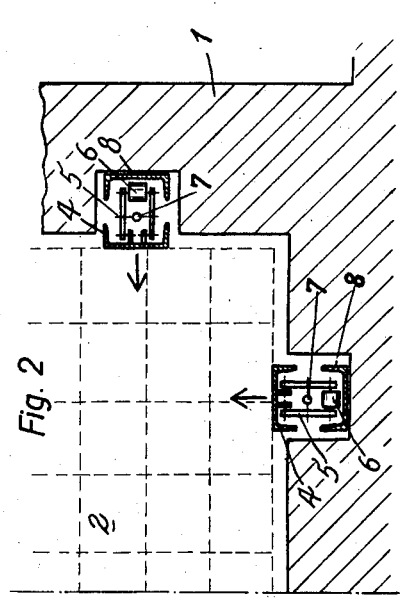
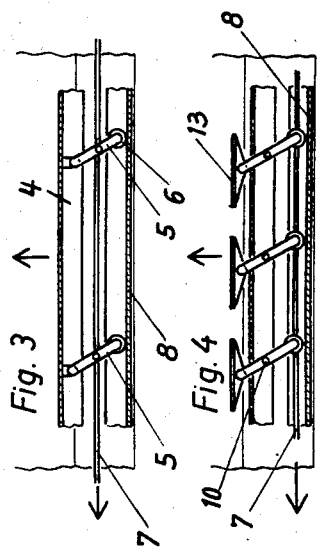
Inventor:
Johann Wilhelm Ludowici
By: Michael S. Striker
agt.

Oct. 13, 1959 J. W. LUDOWICI 2,908,524
APPARATUS FOR TRANSPORTING A STACK OF ARTICLES
INTO AND OUT OF A PROCESSING CHAMBER
Filed March 20, 1956 3 Sheets-Sheet 2
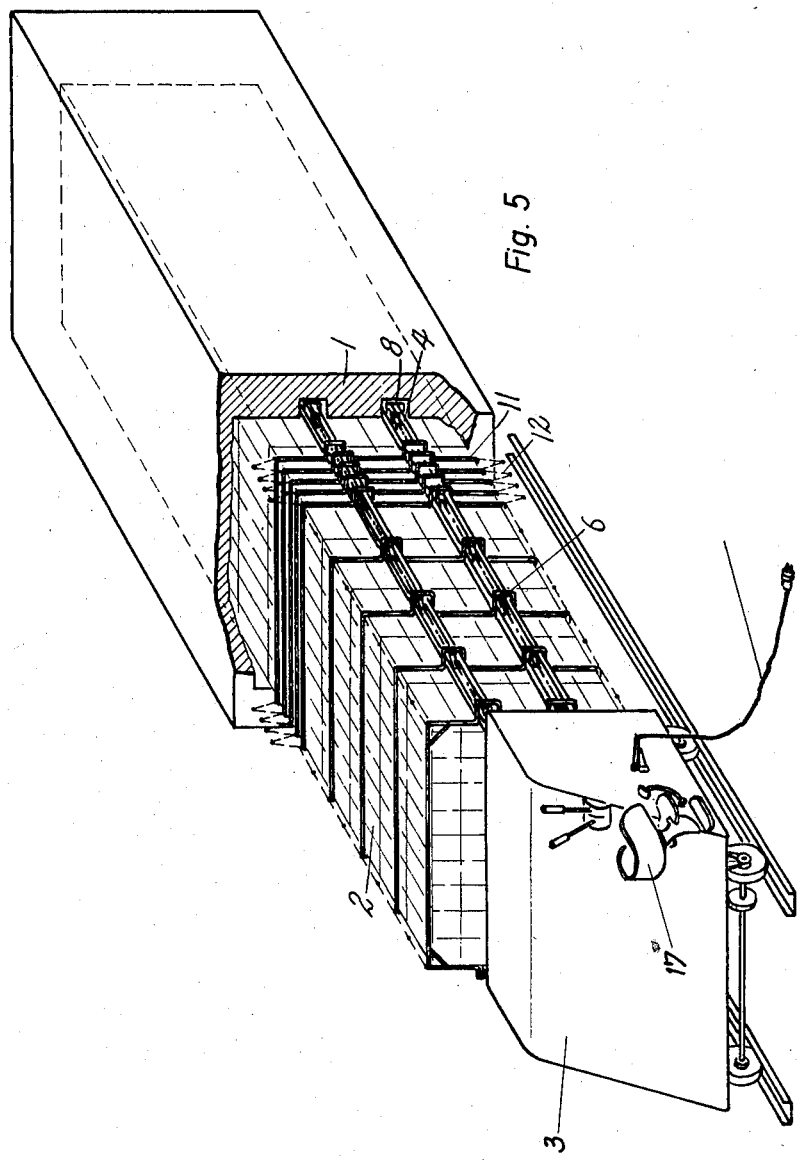
Inventor:
Johann Wilhelm Ludowici
By: Michael S. Striker
agt.

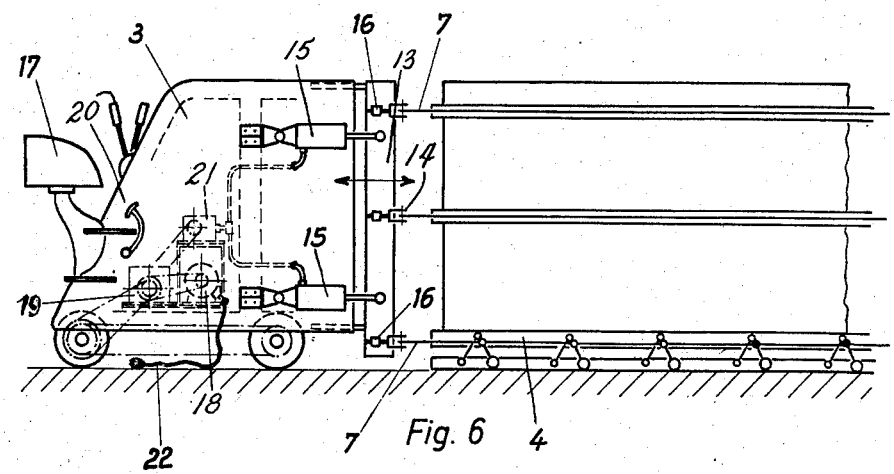
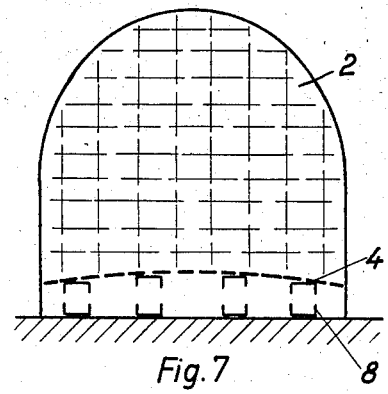
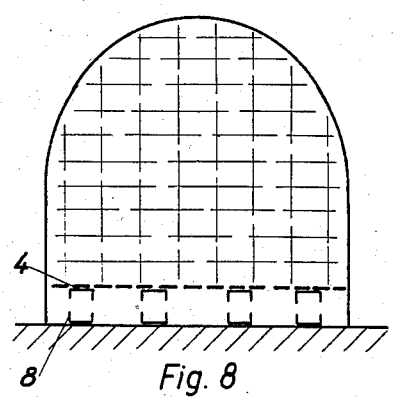
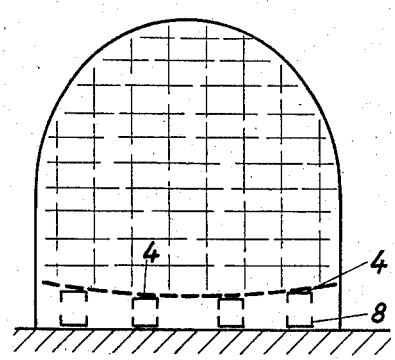
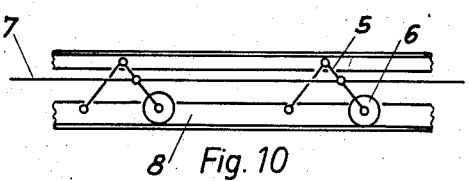
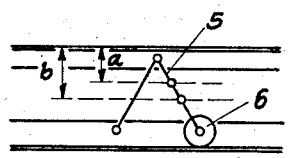

United States Patent Office 2,908,524
Patented Oct. 13, 1959

2,908,524

APPARATUS FOR TRANSPORTING A STACK OF ARTICLES INTO AND OUT OF A PROCESSING CHAMBER

Johann Wilhelm Ludowici, Jockgrim, Germany

Application March 20, 1956, Serial No. 572,745

8 Claims. (Cl. 294—63)

The present invention has for its object to provide apparatus for transporting a stack, which is composed of individual articles, into or out of a processing chamber. The apparatus may be used for example for transporting bricks into a firing chamber, and after some time, for example on completion of the firing process, withdrawing the stack out of the chamber again.

For this purpose it is necessary to take hold of the entire stack, to lift it off the ground, and then to run it into the chamber. According to the invention this is achieved by the use of rails, which are arranged along the sides, and bottom of the stack of articles, the rails being mounted so as to be movable towards and into contact with the opposing surface of the stack, whereby the stack is held securely as a whole, the rails then being movable as a unitary structure to transport the secured stack. Preferably the supporting rails are slidably mounted on guide rails located in cavities extending longitudinally of the chamber with which the apparatus is associated. The movement of the supporting rails can be effected by rocking levers mounted on the rails, the rocking levers having rollers which bear against the guide rails and can also roll along said guide rails. The rocking levers are acted on by draw-rods or the like, by the operation of which a parallel displacement of the guide rails to the supporting rails is effected in the direction of the stack.

The stack is transported into and out of the chamber by means of a carriage which may for example be driven by an electric motor, and which carries on its end face facing the opposing end of the stack, a horizontally slidable frame, on which act all the draw-rods for the displacement of the stack supporting rails. Movement of the frame, which is preferably effected by means of hydraulic cylinders, effects operation of the draw-rods to cause the supporting rails to be pressed against the stack, so that the latter is held as a whole clear of the ground. By means of adjusting devices care can be taken to ensure that the supporting rails located below the stack are disposed at different heights. For example, outer rails can be raised higher or lower than inner rails.

Further features and details of the invention will be seen from the following description, in which embodiments of the invention are explained by way of example with reference to the accompanying drawings.

In the drawings:

Fig. 1 is a side view of the apparatus, partly in section,

Fig. 2 is a fragmentary view to an enlarged scale and in section showing supporting and guide rail constructions located respectively, beneath and at one side of a stack of articles, Fig. 3 is a side view of a portion of guide and supporting rail showing the operation of the draw-rods for raising and lowering the supporting rails, Fig. 4 is a view similar to Fig. 3 but showing a modified construction of supporting rail, Fig. 5 is a perspective view of the complete apparatus showing a stack of articles in readiness for transportation, Fig. 6 is a side view showing in particular the construction of the carriage, Figs. 7, 8 and 9 show diagrammatically and in end view the formation of a stack of articles the upper layers of which are arranged to provide a circular contour.

Figs. 10 and 11 are side views showing diagrammatically alternative adjusting means associated with the guide rails for obtaining the stacking formation shown in Figs. 7, 8 and 9.

Referring to Fig. 1 a chamber 1 is shown in vertical longitudinal section, in which bricks are to be fired. The bricks are piled to form a stack 2 and are introduced into the chamber 1 by means of an electrically driven carriage 3, in the manner described hereinbelow, and on completion of the firing process withdrawn from the chamber by the same means.

At the point where the bricks are stacked outside the firing chamber, supporting rails 4 (see Figure 2, bottom) are provided, which are located in channels formed in the ground, and which can be moved vertically upwards by a device to be described hereinbelow, so that they lift the entire stack 2 off the ground in the upward direction. In addition, on both longer sides of the stack 2 further supporting rails 4 (see Figure 2, right) are provided, which are pressed against the stack by means also hereinafter described. The stack is thus held supported from below and from both sides by the supporting rails and when so held is transported into the chamber 1, and withdrawn therefrom on completion of the firing process.

Each supporting rail 4 abuts with the left end thereof, as viewed in Fig. 1, against the right rear face of the carriage 3 and the movement of the supporting rails 4 is effected by means of a plurality of rockable levers 5 pivoted at their upper ends to rails 4 and disposed along the length of the rails 4, as shown in Figure 3. Each lever 5 has a roller 6 at one end, which bears against a guide rail 8. As shown in Fig. 2, the guide rails 8 beneath the stack are located in cavities in the ground, the guide rails 8 at the side of the stack being located in a cavity in the side of the chamber 1. The levers 5 associated with each supporting rail, are interconnected by a common draw-rod 7, the draw-rod being coupled to each said lever intermediate the length thereof. Each draw-rod can be moved in the direction of the arrow (Figure 3) as will be described later in detail.

When the draw-rod 7 is moved to the left in Fig. 3, the rollers 6 move to the left and thereby raise the supporting rails 4, with the stack 2 lying thereon, in the upward direction. In corresponding manner, the draw-rods 7 of the side supporting rails 4 (Figure 2, right) have the effect of pressing the said rails 4 against the stack 2 whereby the entire stack is held firmly together.

In order to hold the stack more effectively, movable claws 13 (see Figure 4) can be mounted on the levers 5, which are extended above the articulation points 10. In this case the draw-rod 7 acts on the axes of the rollers 6 and rocks the levers 5 about the pivot point 10.

When the carriage 3, the construction of which will be described at a later stage, is moved to the left on completion of the firing process, in order to withdraw the stack from the chamber 1, the rails 4 move further and further away from the supporting rails 8 which are let into the side walls of the chamber 1. In order to prevent the rails 4 from then bending outwards, slidable bands 11 are provided, as shown in Figure 5, which are cranked to embrace the rails 4 and prevent the latter from bending out. These bands 11 are interconnected by cables 12 and are therefore spaced at distances determined by the length of said cables 12, as illustrated in Figure 5.

The construction of the carriage 3, which runs on rails, is illustrated in Figure 6. The carriage is driven by means of an electric motor 18, which drives the wheels through a gear 19. The driver, who takes his position on the seat 17, operates by means of levers and pedals 20 both the movement of the carriage and the starting-up of a hydraulic pump 21, which feeds the hydraulic cylinders 15. The cylinders 15 serve to displace a frame 13, to which the draw-rods 7 are each connected by a coupling member 14. When the wheels of the carriage 3 are braked and the driver operates the hydraulic device 15 so that the frame 13 moves to the left relative to the stationary carriage and the rails 4, all the draw-rods, as shown in Figure 3, are moved to the left, with the result that the levers 5 are removed from the inclined position thereof to a position in which they extend substantially normal to the rails and so that all the rails 4 are pulled inwardly into contact with the stack 2.

In order to ensure that the rails 4 located beneath the stack 2 will be raised to different heights, adjustable screw connections 16 are provided. By differently setting the screw 16 of the rails 4 (in Figure 1 four rails 4 are shown), the two outer rails 4 (Figure 7) can be raised to a lower height than the two middle rails. As a result, an upwardly curved supporting surface for the stack 2 is obtained, which in Figure 7 is indicated by a broken line. This position may be advantageous for running the stack 2 into the chamber 1.

When the stack 2, which has been run in, is deposited in the interior of the chamber 1, it is convenient to re-adjust all the rails 4 so that they are all at the same height, as shown in Figure 8. When withdrawing the stack 2 out of the chamber 1 it is convenient to set the middle rails lower than the outer rails, as is indicated in Figure 9. All these adjustments can be made by means of the screws 16, by means of which the point of application of the draw-rod 7 (Figure 10) on the lever 5 is adjusted. With the same movement of the frame 13 in the horizontal direction, when the screws 16 are suitably adjusted, the rails 4 situated on the outside in Figure 7 can be raised the distance *a* (Figure 11), while the middle rails 4 are raised the distance *b*.

The adjustment of the rails 4 into the position shown in Figure 9 has the advantage that the stack is supported by the slightly inclined outer layers and prevented from dislodging.

The cable 22 serves to connect the driving motor 18 of the carriage 3 to a source of current.

I claim:
1. Apparatus for transporting a stack of articles into and out of a processing chamber comprising a carriage movable towards and away from the processing chamber for moving a stack of articles into and out of the processing chamber, supporting rails connected to said carriage for movement therewith, said supporting rails extending forwardly of said carriage and arranged so as to be located on either side of and beneath a positioned stack of articles, means associated with said supporting rails for effecting displacement of said supporting rails into and out of engagement with the stack of articles and operating means associated with said means for effecting displacement of said supporting rails for controlling operation of the supporting rail displacing means.

2. Apparatus for transporting a stack of articles into and out of a processing chamber comprising a carriage movable towards and away from the processing chamber, supporting rails extending forwardly of the carriage and arranged so as to be located on either side of and beneath a positioned stack of articles, stationary guide rails extending parallel to said supporting rails, means associated with the guide rails and the supporting rails for effecting displacement of the supporting rails into and out of engagement with the stack of articles and operating means mounted on the carriage for controlling operation of the supporting rail displacing means.

3. Apparatus according to claim 2, wherein each support rail is provided along its length with a plurality of levers each said lever being pivotally connected by one end to the associated supporting rail, the opposite end of each lever being in contact with a guide rail, the levers being swingable by operating means to effect displacement of the supporting rails into and out of contact with the stack.

4. Apparatus according to claim 3, wherein the levers associated with each supporting rail are coupled by a common draw-rod, each draw-rod being in turn connected to a movable frame carried by the carriage.

5. Apparatus according to claim 4, wherein the movable frame is operable by fluid pressure means.

6. Apparatus according to claim 2, wherein means are provided for effecting individually adjustment of the amount of movement of the supporting rails.

7. Apparatus according to claim 2, wherein a plurality of bracing bands are provided which embrace the supporting rails, said bands being mounted on the supporting rails so as to be slidable therealong in one direction into spaced relationship and in the opposite direction to a juxtaposed position.

8. Apparatus according to claim 7, wherein the bracing bands are interconnected by cables.

References Cited in the file of this patent

UNITED STATES PATENTS

| | | |
|---|---|---|
| 1,890,361 | Beattie | Dec. 6, 1932 |
| 2,281,595 | Plant et al. | May 5, 1942 |
| 2,609,113 | Huffman | Sept. 2, 1952 |
| 2,668,731 | Neher | Feb. 9, 1954 |